United States Patent
Sarin

(10) Patent No.: US 11,961,070 B2
(45) Date of Patent: Apr. 16, 2024

(54) RESOURCE-BASED DISTRIBUTED PUBLIC LEDGER SYSTEM

(71) Applicant: PayPal, Inc., San Jose, CA (US)

(72) Inventor: Pankaj Sarin, Elkhorn, NE (US)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 17/977,225

(22) Filed: Oct. 31, 2022

(65) Prior Publication Data

US 2023/0122769 A1    Apr. 20, 2023

Related U.S. Application Data

(63) Continuation of application No. 16/204,405, filed on Nov. 29, 2018, now abandoned.

(51) Int. Cl.
    *G06Q 20/38*     (2012.01)
    *G06Q 20/36*     (2012.01)
    *H04L 9/06*      (2006.01)

(52) U.S. Cl.
    CPC ..... *G06Q 20/3678* (2013.01); *G06Q 20/3674* (2013.01); *H04L 9/0637* (2013.01)

(58) Field of Classification Search
    CPC .................................................. G06Q 20/3678
    USPC .......................................................... 705/69
    See application file for complete search history.

(56) References Cited

U.S. PATENT DOCUMENTS

| 2011/0041136 A1* | 2/2011 | Messier ............... G06F 9/5066 718/105 |
| 2015/0262137 A1 | 9/2015 | Armstrong |
| 2015/0356555 A1 | 12/2015 | Pennanen |

(Continued)

FOREIGN PATENT DOCUMENTS

| CN | 107169865 A | 9/2017 |
| CN | 108596619 A | 9/2018 |

(Continued)

OTHER PUBLICATIONS

Extended European Search Report for Application No. 19890133.2 dated Dec. 10, 2021, 8 pages.

(Continued)

*Primary Examiner* — Chinedu C Agwumezie
(74) *Attorney, Agent, or Firm* — Haynes and Boone, LLP

(57) ABSTRACT

Systems and methods for providing a resource-based distributed public crypto currency blockchain include system provider device(s) that receive first crypto currency transaction information for a first crypto currency transaction that is configured to provide for the transfer of a crypto currency to a payee via a primary distributed public crypto currency blockchain maintained by computing devices. The system provider device(s) identify resource information provided by each computing device and use the resource information to select a subset of the computing devices for processing the first crypto currency transaction. The system provider device(s) then broadcast, via the network to each computing device, the first crypto currency transaction information for the first crypto currency transaction in order to cause a first computing device to process the first crypto currency transaction as part of a first block that is added to the primary distributed public crypto currency blockchain.

20 Claims, 10 Drawing Sheets

(56) References Cited

U.S. PATENT DOCUMENTS

| | | | |
|---|---|---|---|
| 2016/0070778 A1* | 3/2016 | Zanter | H04L 45/70 707/737 |
| 2016/0162897 A1 | 6/2016 | Feeney | |
| 2016/0321751 A1 | 11/2016 | Creighton, IV et al. | |
| 2016/0330034 A1 | 11/2016 | Back et al. | |
| 2017/0075941 A1 | 3/2017 | Finlow-Bates | |
| 2017/0221053 A1 | 8/2017 | Goloshchuck | |
| 2017/0244757 A1 | 8/2017 | Castinado et al. | |
| 2017/0300875 A1 | 10/2017 | Gilboa et al. | |
| 2018/0006807 A1 | 1/2018 | Suresh et al. | |
| 2018/0025435 A1 | 1/2018 | Karame et al. | |
| 2018/0285412 A1 | 10/2018 | Zhuang | |
| 2019/0036957 A1 | 1/2019 | Smith et al. | |
| 2019/0182055 A1* | 6/2019 | Christidis | H04L 63/12 |
| 2019/0190698 A1 | 6/2019 | Nuzzi | |
| 2019/0266178 A1* | 8/2019 | Madhavan | G06F 16/2365 |
| 2021/0064763 A1 | 3/2021 | Sanghvi et al. | |

FOREIGN PATENT DOCUMENTS

| | | |
|---|---|---|
| CN | 108701305 A | 10/2018 |
| WO | 2018189657 A1 | 10/2018 |
| WO | 2018207064 A1 | 11/2018 |

OTHER PUBLICATIONS

International Appl. No. PCT/US2019/063724, International Search Report and Written Opinion dated Feb. 5, 2020, 7 pages.
International Application No. PCT/US2019/063724, International Preliminary Report on Patentability dated Jun. 10, 2021, 6 pages.
Dorri A., et al., "Towards an Optimized BlockChain for IoT," IEEE/ACM Second International Conference on Internet-of-Things Design and Implementation (IoTDI), Apr. 2017, retrieved from https://dl.acm.org/doi/pdf/10.1145/3054977.3055003, on Jan. 21, 2020, pp. 173-178.
Extended European Search Report for Application No. 19890133.2 mailed on Dec. 10, 2021, 8 pages.
International Appl. No. PCT/US2019/063724, International Search Report and Written Opinion mailed Feb. 5, 2020, 7 pages.
International Application No. PCT/US2019/063724, International Preliminary Report on Patentability mailed on Jun. 10, 2021, 6 pages.
Narayanan A., et al., "Bitcoin and Cryptocurrency Technologies," Bitcoin and Cryptocurrency Technologies, XP055574627, Retrieved from Internet URL: https://d28rh4a8wq0iu5.cloudfront.net/bitcointech/readings/princeton_bitcoin_book.pdf, Feb. 9, 2016, 308 pages.
Office Action mailed Dec. 27, 2023, received Jan. 2, 2024, in corresponding Chinese Application No. 201980077847.0, 13 pages.

* cited by examiner

US 11,961,070 B2

RESOURCE-BASED DISTRIBUTED PUBLIC LEDGER SYSTEM

CROSS-REFERENCE TO RELATED APPLICATIONS

This application is a continuation of U.S. patent application Ser. No. 16/204,405 filed on Nov. 29, 2018, the benefit of which is claimed and the disclosure of which is incorporated in its entirety.

BACKGROUND

The present disclosure generally relates to distributed public ledgers, and more particularly to providing resource-based distributed public ledgers that may be utilized for electronic transactions.

RELATED ART

More and more consumers are conducting transactions over electronic networks such as, for example, the Internet. Consumers routinely purchase products and services from merchants and individuals alike. The transactions may take place directly between a conventional or on-line merchant or retailer and the consumer, and payment is typically made by entering credit card or other financial information. Transactions may also take place with the aid of an on-line or mobile payment service provider such as, for example, PayPal, Inc. of San Jose, CA Such payment service providers can make transactions easier and safer for the parties involved. Purchasing with the assistance of a payment service provider from the convenience of virtually anywhere using a mobile device is one main reason why on-line and mobile purchases are growing very quickly.

Conventional payment service providers typically provide for payment by a payer to a payee through the use of payer accounts of the payer (e.g., credit accounts, banking account, and/or a variety of other payer accounts that may be provided by an account provider). For example, the payment service provider may provide a payment service account to the payer, and the payer may link one or more payer accounts to the payment service account (or the payment service account may include a payer account provided by the payment service provider). In a transaction between the payer and the payee, the payment service provider may then transfer funds from one of the payer accounts to a payee account of the payee (which may also be provided by the account providers or payment service provider).

An alternative to the payer accounts and payee accounts provided by account providers, discussed above, is the use of distributed crypto currencies such as, for example, Bitcoin. Distributed crypto currencies are not controlled by any central authority, but rather by a distributed network of computing devices (also called "miner devices") that operate to confirm transfers of the crypto currency between payers and payees. In conventional distributed crypto currency systems, any computing device may receive crypto currency transactions broadcast by payer devices, and operate to provide those crypto currency transactions in a block that may then be processed (in an operation typically referred to as "mining"), with the processed block broadcast to other computing devices in the distributed network of computing devices for addition to a distributed crypto currency public ledger that is maintained by each of those computing devices and that tracks the ownership of the crypto currency. However, the processing/mining of blocks for a distributed crypto currency public ledger is notoriously wasteful with regard to processing power and energy, as any user may dedicate their computing device to performing such processing/mining, resulting in many computing devices expending their processing power and utilizing energy without actually processing a block that will be added to the distributed crypto currency public ledger.

Thus, Applicant recognizes that there is a need for an improved distributed public ledger system.

Figure 1:
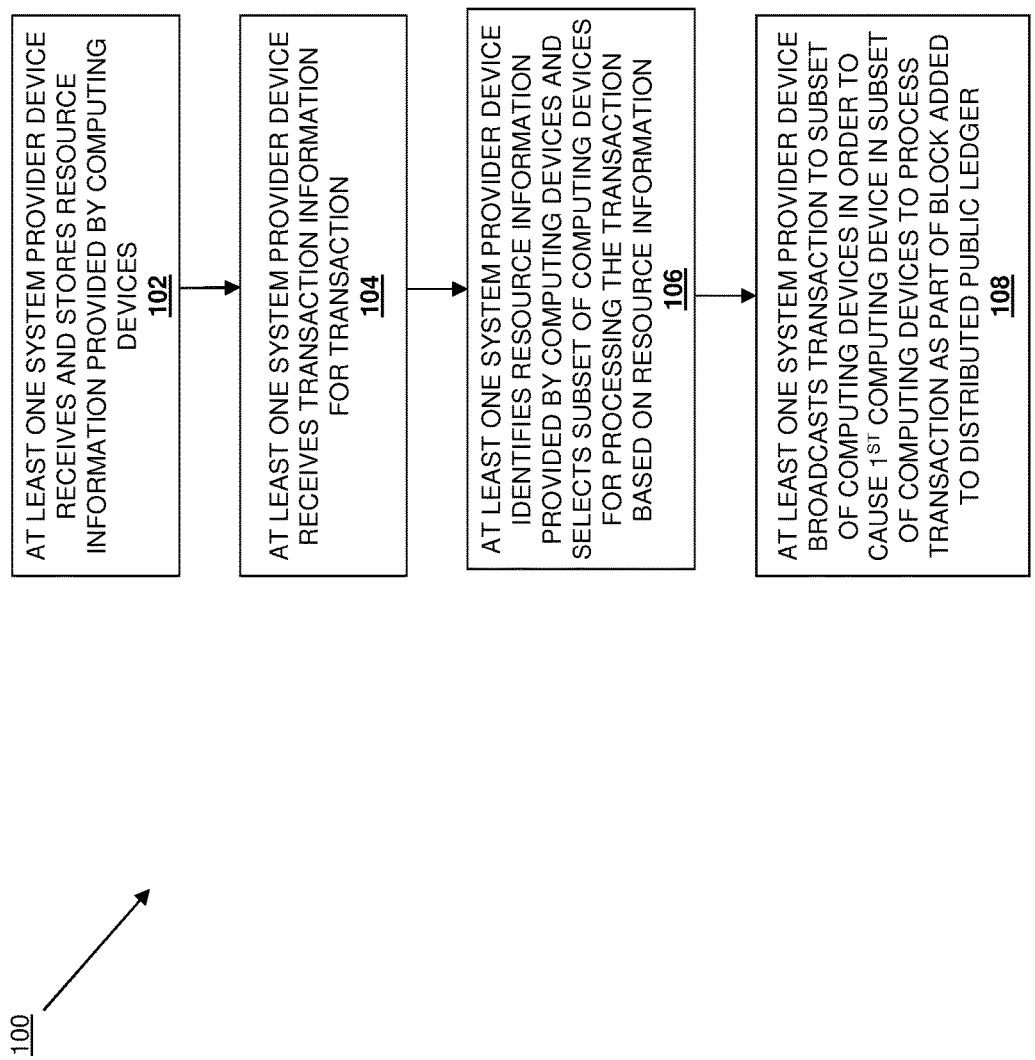
FIG. 1 is a flow chart illustrating an embodiment of a method for providing a resource-based distributed public ledger.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Some embodiments of the present disclosure provide systems and methods for maintaining a distributed public ledger via mining devices that are selected based on one or more of their available resources. For example, miner devices that are configured to process transactions as part of a block in a distributed public ledger such as a crypto currency blockchain may report information about their available resources, and then a transaction may be broadcast to subsets of those miner devices that are associated with resource information that satisfies desirable resource characteristics. As such, a distributed public ledger may be maintained by miner devices that have a minimal processing efficiency, miner devices that are operating using energy that is below a maximum cost, miner devices that are located in a particular area (or only miner devices that are not located in a particular area), miner devices that are capable of processing blocks in less than a maximum time period, and/or miner devices that exhibit virtually any other resource characteristic that would be apparent to one of skill in the art in possession of the present disclosure.

Figure 2:
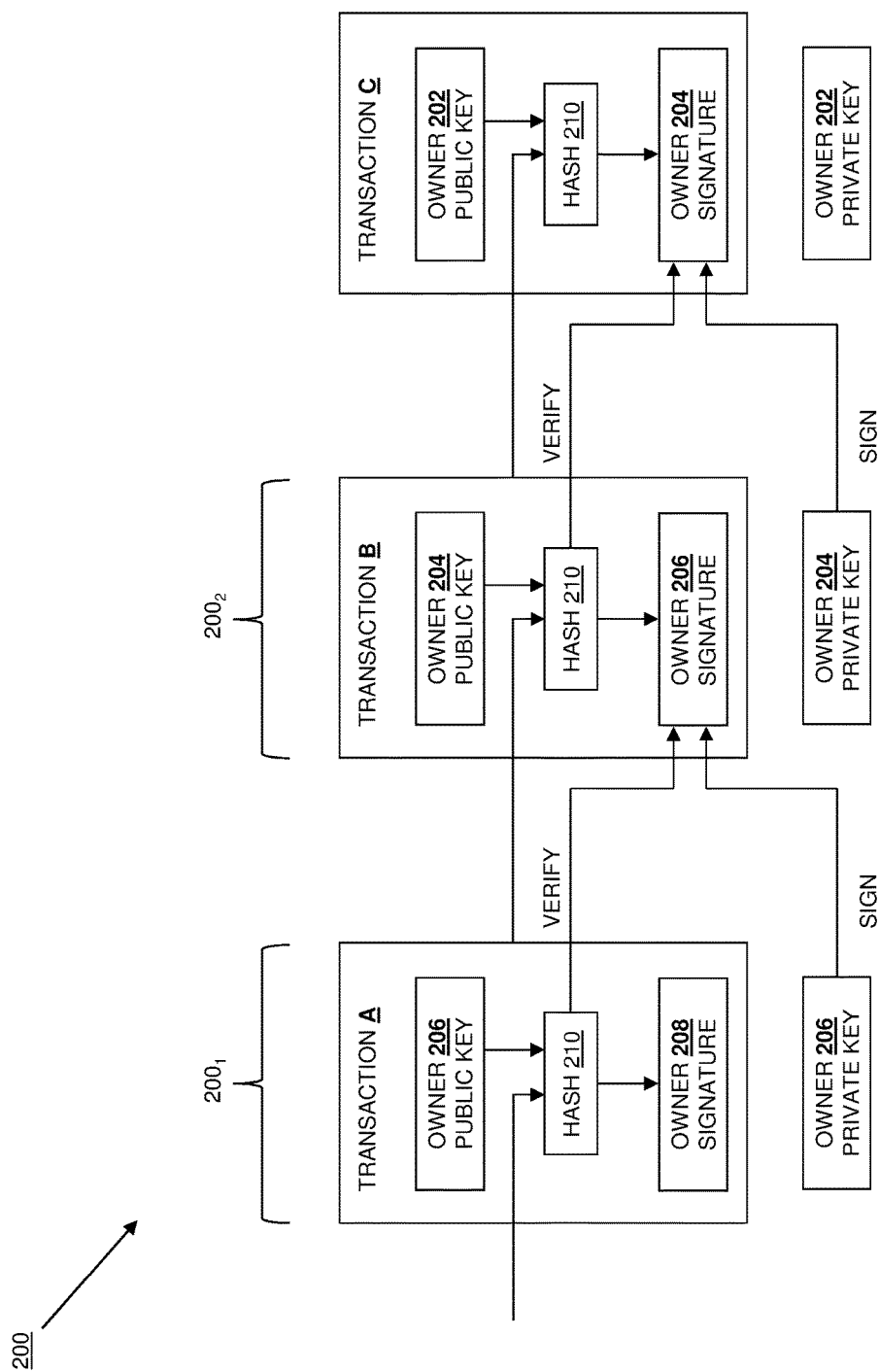
FIG. 2 is a schematic view illustrating an embodiment of an electronic coin or crypto currency.
Figure 3:
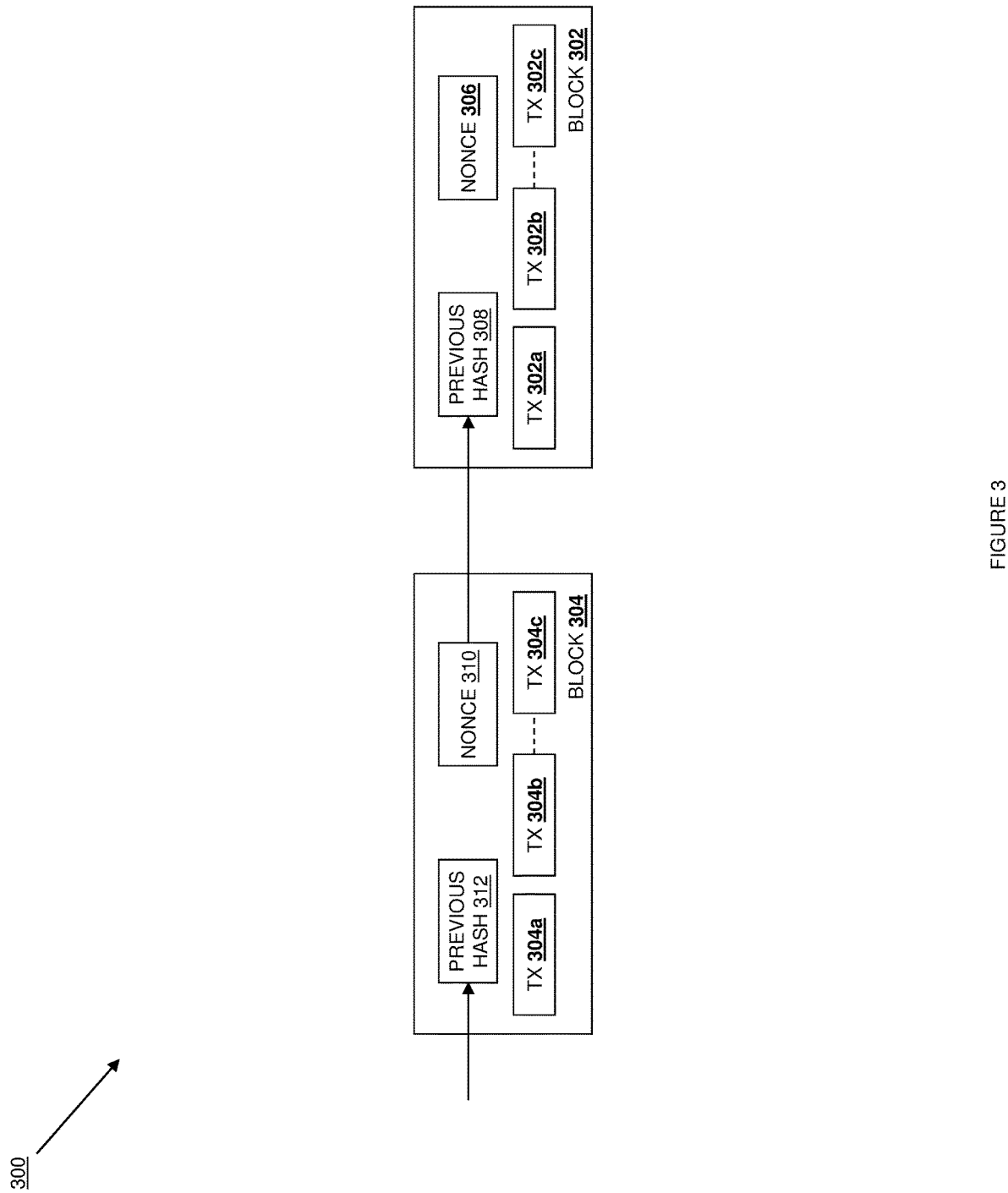
FIG. 3 is a schematic view illustrating an embodiment of a crypto currency public ledger.

Referring now to FIGS. 1, 2, and 3, a method 100 for providing a resource-based distributed public ledger is illustrated. In some embodiments of the method 100 described below, one or more system provider devices may operate to perform the method 100. For example, a partially centralized system (e.g., including one or more system provider devices controlled by one or more centralized and/or cooperating entities) may operate with payer devices that generate transactions that are performed via a distributed public ledger, and mining devices that maintain that distributed public ledger, in order to provide the resource-based distributed public ledger described herein. In a specific example, a payment service provider such as, for example, PAYPAL®, Inc. of San Jose, California, United States, may utilize one or more payment service provider devices/system provider devices as part of the partially centralized system that performs the method 100 discussed in some of the examples below.

In another example, a decentralized system may include one or more system provider devices, which may be provided by payer devices and controlled by one or more non-cooperating entities, operate to maintain the distributed public ledger in order to provide the resource-based distributed public ledger described herein, and may operate in cooperation with one or more miner devices that operate to maintain the primary distributed public ledger discussed in some of the examples below, while also maintaining a secondary distributed public ledger (which may be a "sidechain" for the primary distributed public ledger) in order to provide the resource-based distributed public ledger described herein. However, these embodiments are meant to be merely exemplary, and one of skill in the art in possession of the present disclosure will recognize that a wide variety of system provider devices may operate, alone or together, to provide the systems and methods discussed herein without departing from the scope of the present disclosure.

Referring now to FIG. 2, an embodiment of an electronic coin 200 (or "crypto currency") is illustrated and described briefly for reference to the method 100 discussed below. In some embodiments, the resource-based distributed public ledger system associated with the present disclosure may utilize a distributed public crypto currency blockchain (also referred to as a "crypto currency blockchain" below) that defines an electronic coin as a chain of digital signatures provided by previous owners of the electronic coin to subsequent owners of the electronic coin. In the illustrated embodiment, the electronic coin 200 is owned by an owner 202, and FIG. 2 illustrates how the electronic coin 200 is defined by the digital signatures of the previous owners 204, 206, and 208. Specifically, in transaction A, a hash 210 of the public key of owner 206 (i.e., the owner receiving, as a result of transaction A, an electronic coin $200_1$ defined by digital signatures provided up to transaction A) and the previous transaction (not illustrated, but occurring prior to transaction A) was signed by owner 208 (i.e., the owner providing, as a result of transaction A, the electronic coin $200_1$ defined by digital signatures provided up to transaction A) and added to an initial electronic coin (which was defined by digital signatures provided up to the transaction prior to transaction A) such that the electronic coin $200_1$ was transferred to owner 206.

Similarly, in transaction B, a hash 210 of the public key of owner 204 (i.e., the owner receiving, as a result of transaction B, an electronic coin $200_2$ defined by digital signatures provided up to transaction B) and transaction A was signed by owner 206 and added to the electronic coin $200_1$ such that the electronic coin $200_2$ was transferred to owner 204. Similarly, in transaction C, a hash 210 of the public key of owner 202 (i.e., the owner receiving, as a result of transaction C, the electronic coin 200 defined by digital signatures provided up to transaction C) and the transaction B was signed by owner 204 and added to the electronic coin $200_2$ such that the electronic coin 200 was transferred to owner 202. As is understood in the art, any payee receiving an electronic coin (e.g., owner 206 in transaction A, owner 204 in transaction B, and owner 202 in transaction C) can verify the signatures to verify the chain of ownership of the electronic coin. In the discussion below, it should be understood that the term "electronic coins" is used to encompass any amount of electronic coins or crypto currency, from fractions of a coin (e.g., 0.00564500 electronic coins) to many multiples of coins (e.g., 56,000.00000000 electronic coins).

Referring now to FIG. 3, an embodiment of a distributed public crypto currency ledger 300 is illustrated and described briefly for reference to the method 100 discussed below. The distributed public crypto currency ledger 300 operates to verify that payers transferring an electronic coin (e.g., referring back to FIG. 2, owner 206 in transaction A, owner 204 in transaction B, and owner 202 in transaction C) did not "double-spend" (e.g., sign any previous transactions involving) that electronic coin. To produce the distributed public crypto currency ledger 300, a distributed network of computing devices (also referred to as "mining devices" below) operate to agree on a single history of transactions in the order in which they were received such that it may be determined that a transaction between a payer and a payee using an electronic coin is the first transaction associated with that electronic coin. Each computing device in the distributed network operates to collect new transactions into a block, and then to increment a proof-of work system that includes determining a value that when hashed with the block provides a required number of zero bits.

For example, for a block 302 that includes a plurality of transactions 302a, 302b, and up to 302c, a computing device in the distributed network may increment a nonce 306 in the block 302 until a value is found that gives a hash of the block 302 (which may a previous hash 308 of the block 304, the transactions 302a-c, and the nonce 306) the required number of zero bits. The computing device may then "chain" the block 302 to the previous block 304 (which was produced in the manner described above for the block 302 using a nonce 310, a previous hash 312, the transactions 304a-304c, and may have been "chained" to a previous block, not illustrated, in the same manner). When computing devices in the distributed network find the proof-of-work for a block, that block (e.g., block 302) is broadcast to the distributed network, and other computing devices in the distributed network will accept that block if all the transactions in it are valid and not already spent (which may be determined by creating the next block using the hash of the accepted block 302). The distributed network will always consider the longest chain of blocks to be the correct one and will operate to continue to extend it. If a computing device receives two different versions of a block, it will work on the first block received, but save the second block received in case the branch of the chain that includes the second block becomes longer (at which point that device will switch to working on the branch of the chain that includes the second block).

In the manner described above, a distributed public crypto currency ledger 300 is provided in which payers and payees may participate in transactions with each other using the electronic coins discussed above and without the need for a centralized authority such as a bank. Each of those transactions is recorded in the distributed public crypto currency ledger to ensure that the electronic coins may only be spent by a payer once. However, while specific embodiments of distributed public crypto currency ledgers are provided below, one of skill in the art in possession of the present disclosure will recognize that distributed public ledgers that track the ownership of other digital assets will fall within the scope of the present disclosure as well, as a variety of distributed public ledger systems will benefit from the transaction/block processing of the present disclosure that is based on mining device resources as discussed below.

Figure 4:
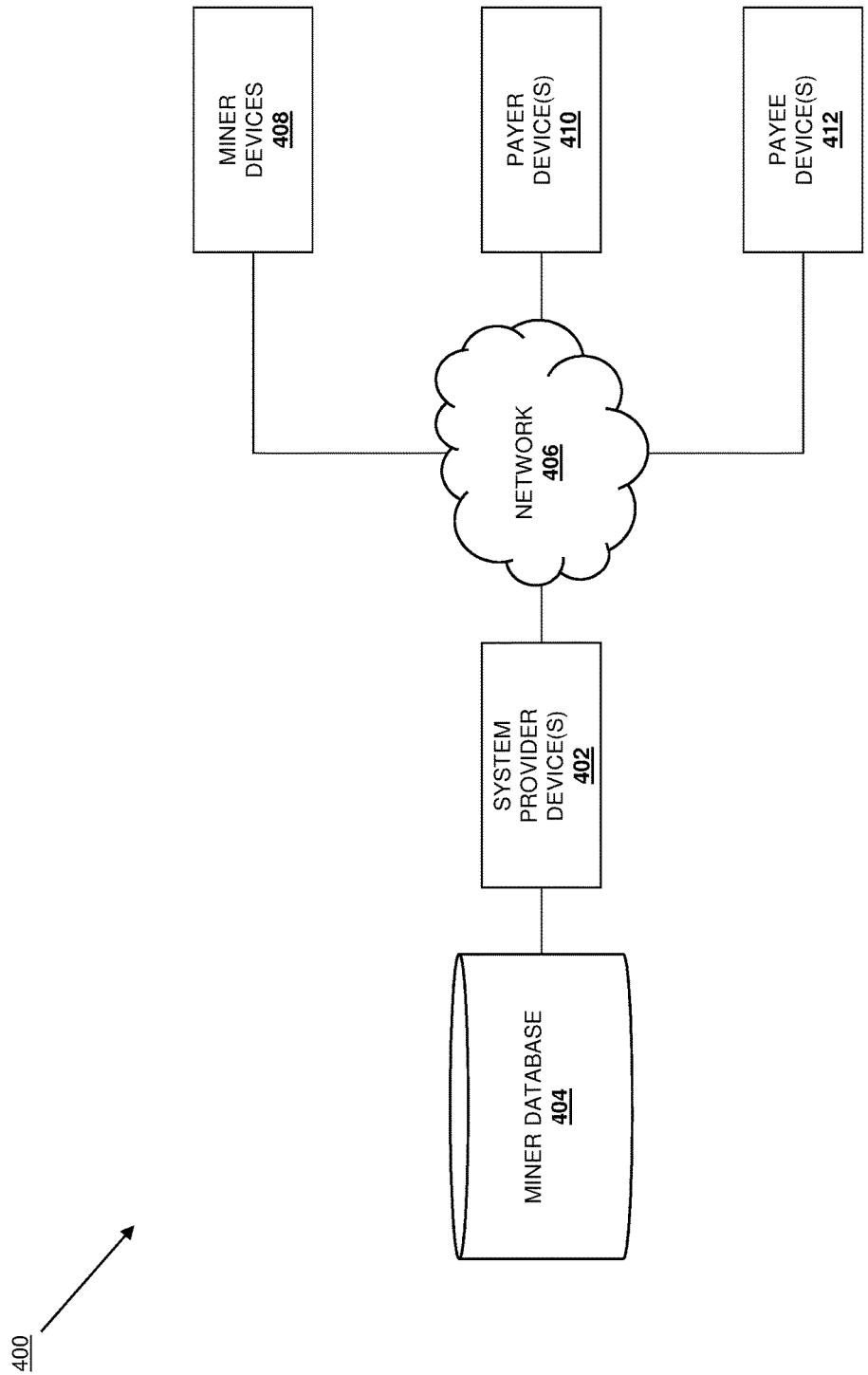
FIG. 4 is a schematic view illustrating an embodiment of a partially centralized resource-based distributed public ledger system.

The method 100 begins at block 102 where at least one system provider device receives and stores resource information provided by a plurality of computing/miner devices. With reference to FIG. 4, and as discussed above, in some embodiments the method 100 may be performed by a partially centralized system 400 via at least one system provider device 402 that is controlled by one or more cooperating entities such as, for example, PAYPAL® Inc. of San Jose, California, United States. As illustrated in FIG. 4, the system provider device(s) 402 may be coupled to a miner database 404 that is configured to store resource information received from the miner devices discussed below, and coupled to a network 406 such as, for example, the Internet. Furthermore, a plurality of miner devices 408 are coupled to the network 406 and may be provided by respective computing devices that are configured to maintain the distributed public ledger of the present disclosure in substantially the same manner detailed above for the distributed public crypto currency ledger 300 illustrated in FIG. 3. Furthermore, one or more payer devices 410 and one or more payee devices 412 are also coupled to the network 406, with the payer device(s) 410 configured to generate and broadcast transactions (e.g., the crypto currency transaction described herein) that are configured to transfer the ownership of digital assets via the distributed public ledger (e.g., the distributed public crypto currency ledger 300) to payees associated with the payee devices 412. However, while a specific partially centralized system 400 provided according to the teachings of the present disclosure has been illustrated and described, one of skill in the art in possession of the present disclosure will recognize that partially centralized systems provided according to the teachings of the present disclosure may include a variety of different devices and/or device configurations while remaining within the scope of the present disclosure as well.

As such, with reference to the embodiment illustrated in FIG. 4, at block 102 each of the miner devices 408 may operate to transmit, through the network 406, resource information to the system provider device(s) 402. The resource information transmitted by each of the miner devices 408 may be transmitted continually, periodically, and/or at any interval that ensures that the resource information provided by the miner devices 408 is up-to-date, "current", or otherwise satisfies timing requirements implemented in the system 400. The resource information transmitted by each of the miner devices 408 may include, for example, an amount of available disk space on that miner device, an age of that mining device, a processing efficiency for that mining device, an average time taken to mine a block for the distributed public ledger (e.g., a blockchain) by that mining device, meta-details of applications running on that mining device and their impact on latency related to mining blocks for the distributed public ledger (e.g., a blockchain) by that mining device, energy costs associated with operating that mining device, an energy consumption required to mine a block for the distributed public ledger (e.g., a blockchain) by the mining device, a location where that mining device is located, planned electricity outages in the area in which that mining device is located, a last known inadvertent shutdown of the miner device, a public key associated with the miner device, and/or any other resource information that would be apparent to one of skill in the art in possession of the present disclosure.

In some embodiments, the resource information transmitted by any or all of the miner devices 408 may include a resource value or resource score that may be determined based on any of the factors discussed above. As such, the systems and methods of the present disclosure may implement one or more calculations, algorithms, or other resource-information-determining methods for inputting any resource characteristics about a miner device and outputting a resource value/score that is indicative of the resources available to that miner device. As such, each of the miner devices 408 may be configured to determine a resource value/score for itself and provide that resource value/score as the resource information transmitted to the system provider device(s) 402 at block 102. In specific embodiments, the resource value/score may be transmitted as part of a token transmitted by the miner devices 408. For example, a token may encapsulate the resource score, public keys of the miner, and or/the frequency of next expected update of resource score, which may lead to reprioritization of the respective miner's token in the token queuing system (e.g., representing a preferential miner pool).

Thus, at block 102, the system provider device(s) 402 may receive the resource information transmitted by each of the miner devices 408 and, in response, store that resource information in the miner database 404 in association with each miner device that transmitted it. As such, following block 102 (which may be performed a variety of different times over any time period, in some examples, repeatedly by miner devices 408), the miner database 404 may store an identifier for each of the miner devices 408 in association with the resource information received from that miner device. In some embodiments, any of the miner devices 408 may allow access by the system provider device(s) 402 to that miner device in order to allow the system provider device(s) 402 to verify resource information reported by that miner device 408.

Figure 5A:
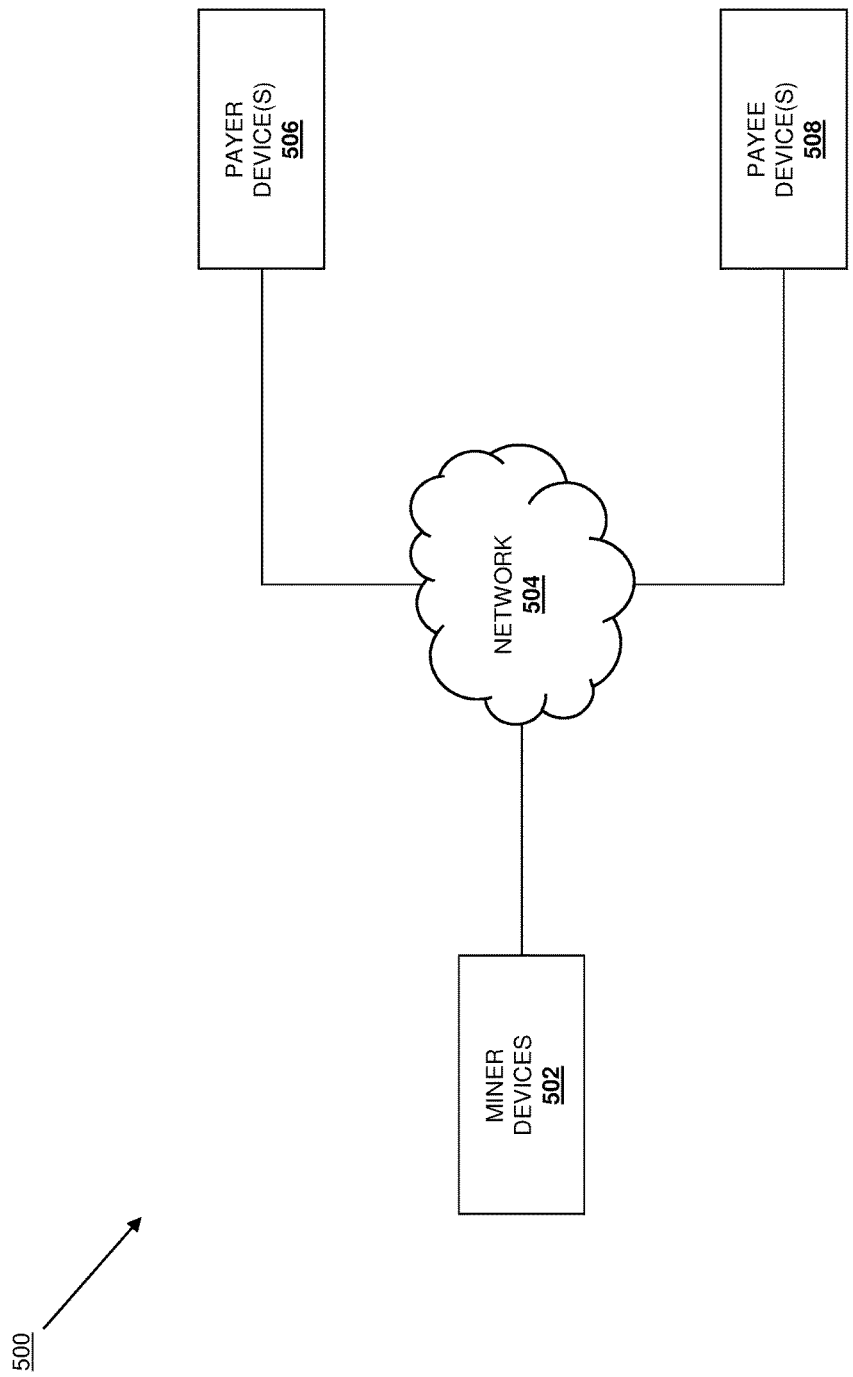
FIG. 5A is a schematic view illustrating an embodiment of a decentralized resource-based distributed public ledger.
Figure 5B:
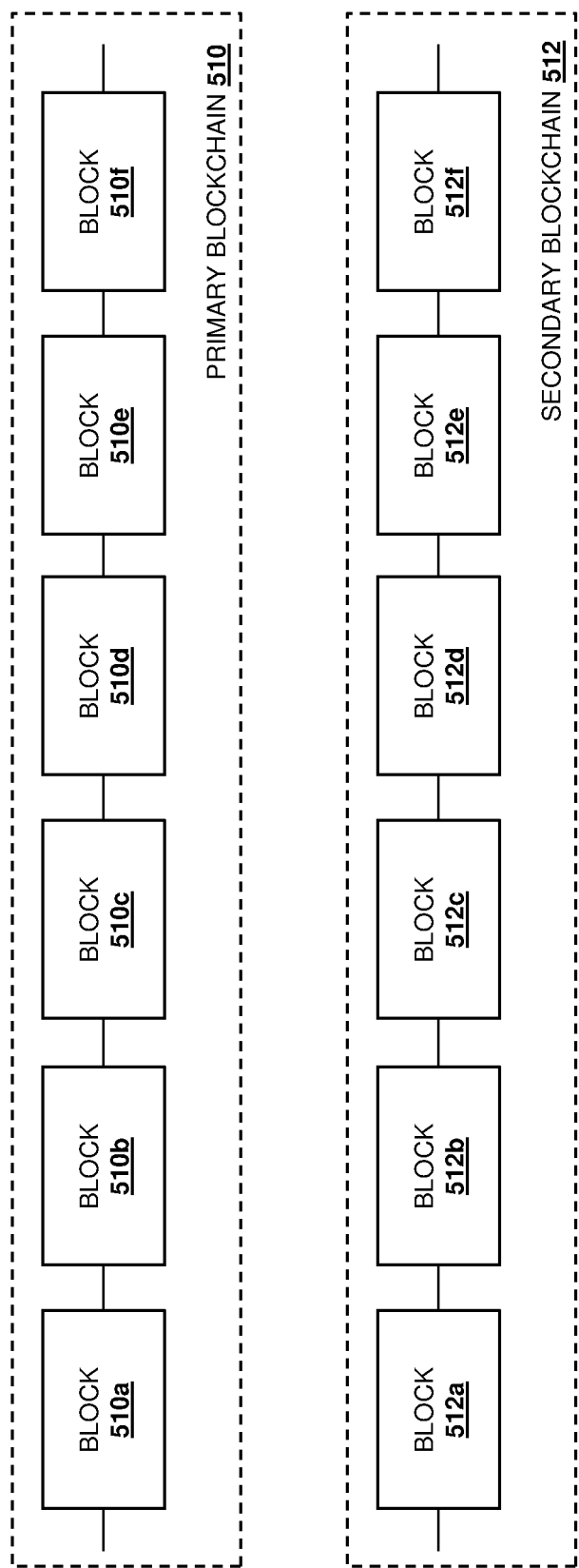
FIG. 5B is a schematic view illustrating an embodiment of a primary ledger and a secondary ledger that may be used in the decentralized resource-based distributed public ledger system of FIG. 5A.

With reference to FIGS. 5A and 5B, and as discussed above, in some embodiments a portion of the method 100 may be performed by a decentralized system 500 via miner devices 502 that may each include a respective computing device that is configured to maintain the distributed public ledger in substantially the manner described above for the distributed public crypto currency ledger 300 discussed above with reference to FIG. 3. As illustrated in FIGS. 5A and 5B, the miner devices 502 may be coupled to a network 504 such as, for example, the Internet. Furthermore, a portion of the method 100 may be performed by one or more payer devices 506 that are coupled to the network 504 and configured to select subsets of the miner devices 502 based on their available resources and then generate and broadcast transactions (e.g., the crypto currency transactions described herein) to that subset of miner devices 502, with those transactions configured to transfer the ownership of digital assets via the distributed public ledger (e.g., the distributed public crypto currency ledger 300) to payees associated with one or more payee devices 508 are also coupled to the network 504. However, while a decentralized system 500 provided according to the teachings of the present disclosure has been illustrated and described, one of skill in the art in possession of the present disclosure will recognize that decentralized systems provided according to the teachings of the present disclosure may include a variety of different devices and/or device configurations while remaining within the scope of the present disclosure as well.

As such, with reference to the embodiment illustrated in FIGS. 5A and 5B, at block 102, each of the miner devices 502 may operate to transmit, through the network 504, resource information to other miner devices. The resource information transmitted by each of the miner devices 502 may be transmitted continually, periodically, and/or any interval that ensures that the resource information provided by the miner devices 408 is up-to-date, "current", and/or otherwise satisfies timing requirements for the system 500. The resource information transmitted by each of the miner devices 502 may include, for example, an amount of available disk space on that miner device, an age of that mining device, a processing efficiency for that mining device, an average time taken to mine a block for the distributed public ledger (e.g., a blockchain) by that mining device, meta-details of applications running on that mining device and their impact on latency related to mining blocks for the distributed public ledger (e.g., a blockchain) by that mining device, energy costs associated with operating that mining device, an energy consumption required to mine a block for the distributed public ledger (e.g., a blockchain) by the mining device, a location where that mining device is located, planned electricity outages in the area in which that mining device is located, a last known inadvertent shutdown of the miner device, a public key associated with the miner device, and/or any other resource information that would be apparent to one of skill in the art in possession of the present disclosure.

Similarly as discussed above, in some embodiments, the resource information transmitted by any or all of the miner devices 502 may include a resource value or resource score that may be determined based on any of the factors discussed above. As such, the systems and methods of the present disclosure may implement one or more calculations, algorithms, or other resource-information-determining methods for inputting any resource characteristics about a miner device and outputting a resource value/score that is indicative of the resources available to that miner device. As such, each of the miner devices 408 may be configured to determine a resource value/score for itself and provide that resource value/score as the resource information transmitted to the other miner devices 502 at block 102. In specific embodiments, the resource value/score may be transmitted as part of a token transmitted by the miner devices 502.

In an embodiment of block 102, the resource information provided by each of the miner devices 502 may be broadcast by that miner device as part of a transaction that is directed towards a secondary distributed public ledger address (also referred to as a secondary blockchain address below) included in a primary distributed public ledger (also referred to as the primary blockchain below). With reference to FIG. 5B, a primary blockchain 510 made up of a plurality of blocks 510a-f may be linked to a secondary blockchain 512 made up of a plurality of blocks 512a-f. For example, the secondary blockchain 512 may be provided as a "sidechain" for the primary blockchain 510, and one of skill in the art in possession of the present disclosure will recognize that transactions directed to a secondary blockchain address included on the primary blockchain 510 may cause transactions to be created and stored on the secondary blockchain 512. As such, resource information provided by each of the miner devices 502 in a transaction directed to a secondary blockchain address on the primary blockchain 510 may cause a transaction to be created on the secondary blockchain 512 that stores that resource information on the secondary blockchain 512.

Thus, at block 102, the miner devices 502 may receive those transactions that include the resource information transmitted by any particular miner device and, in response, process those transactions to cause their associated resource information to be stored in the secondary blockchain 512 in association with each miner device that transmitted it. As such, following block 102 (which may be performed a variety of different times over any time period, and/or multiple times by any of the miner devices 502), the secondary blockchain 512 may store an identifier for each of the miner devices 502 in association with the resource information received from that miner device. In some embodiments, the miner devices 502 may provide access to the payer device(s) 506 in order to allow the payer device(s) 506 to verify resource information reported by those miner devices 502.

The method 100 then proceeds to block 104 where the at least one system provider device receives transaction information for a transaction. With reference to the partially centralized system 400 illustrated in FIG. 4, in an embodiment of block 104, a payer device 410 may generate a transaction (e.g., similar to the crypto currency transaction discussed above) that includes transaction information that is configured to provide for the transfer of a digital asset to a payee associated with one of the payee devices 412 via the distributed public ledger (e.g., similar to the distributed public crypto currency ledger 300 discussed above), and transmit that transaction through the network 406 to the system provide device(s) 402. As such, at block 104, the system provider device(s) 402 may receive the transaction information in the transaction generated and transmitted by the payer device 408. One of skill in the art in possession of the present disclosure will recognize that multiple payer devices may generate and transmit transactions in a similar manner as discussed above at block 104 (which may be performed at a plurality of different times and/or over some time period by any number of payer devices 410) such that the system provider device(s) 402 receive respective transaction information for transactions generated and transmitted by multiple different payer devices.

With reference to the decentralized system 500 illustrated in FIGS. 5A and 5B, in an embodiment of block 104, a payer device 506 may generate a transaction (e.g., similar to the crypto currency transaction discussed above) that includes transaction information that is configured to provide for the transfer of a digital asset to a payee associated with one of the payee devices 508 via the distributed public ledger (e.g., similar to the distributed public crypto currency ledger 300 discussed above). In some examples of the decentralized system 500, payer devices 506 may include a wallet application (e.g., a crypto currency wallet application) that includes a transaction generating subsystem that is configured to generate a transaction, with that wallet application also including a resource-based transaction broadcasting subsystem that is configured to act as a system provider device that performs at least a portion of the method 100 by "receiving" the transaction that was generated by the transaction generating subsystem portion of the wallet application on the payer device. As such, at block 104, the resource-based transaction broadcasting subsystem in the payer device 506 may receive the transaction information in the transaction generated and transmitted by the transaction generating subsystem in the payer device 506. One of skill in the art in possession of the present disclosure will recognize that multiple payer devices may include transaction generating subsystems that generate transactions in a similar manner as discussed above at block 104 (which may be performed at a plurality of different times and/or over some time period by those payer devices) such that the resource-based transaction broadcasting subsystem in those payer devices receive respective transaction information for transactions generated by their respective transaction generating subsystems.

The method 100 then proceeds to block 106 where the at least one system provider device identifies resource information provided by the plurality of computing devices and selects a subset of the plurality of computing devices for processing the transaction based on their associated resource information. With reference to the partially centralized system 400 illustrated in FIG. 4, in an embodiment of block 106 and upon receiving the transaction information for the transaction at block 104, the system provider device(s) 402 may access the miner database 404 to identify the respective resource information associated with the identifiers for each of the miner devices 408, and select a subset of the miner devices for processing the transaction based on the identified resource information.

For example, at block 106, the system provider device(s) 402 may access the miner database 404 and identify resource information that indicates that its associated miner device includes an amount of available disk space that is greater than a predetermined amount of disk space, resource information that indicates that its associated miner device includes an age that is less than a predetermined age, resource information that indicates that its associated miner device includes a processing efficiency that is greater than a minimum processing efficiency, resource information that indicates that its associated miner device is associated with an average time taken to mine a block for the distributed public ledger (e.g., a blockchain) that is less than a predetermined time, resource information that indicates that its associated miner device includes meta-details of applications running on that mining device and their impact on latency related to mining blocks for the distributed public ledger (e.g., a blockchain) that is less than a predetermined latency, resource information that indicates that its associated miner device includes energy costs associated with operating that mining device that are less than a predetermined energy cost, resource information that indicates that its associated miner device includes an energy consumption required to mine a block for the distributed public ledger (e.g., a blockchain) that is less than a predetermined energy consumption, resource information that indicates that its associated miner device is located at a location that is one of plurality of authorized locations, resource information that indicates that its associated miner device is located in an area with a planned electricity outage, resource information that indicates that its associated miner device was associated with a last known inadvertent shutdown over a predetermined time ago, and/or any resource information that includes any other resource information characteristics that would be apparent to one of skill in the art in possession of the present disclosure.

In other embodiments, the system provider device(s) 402 may access the miner database 404 and identify resource information that indicates that its associated miner device is associated with the resource value/score that may be determined and transmitted by the miner devices 408 as part of the resource information at block 102. In other embodiments, the system provider device(s) 402 may use the resource information transmitted by any or all of the miner devices 408 to calculate the resource value or resource score discussed above based on any of the factors included in the resource information. As such, the system provider device(s) 402 may implement calculations, algorithms, or other resource-information-determining methods for inputting any resource characteristics about a miner device that are included in their associated resource information, and outputting a resource value/score that is indicative of the resources available to that miner device.

In response to identifying the resource information at block 106, the system provider device(s) 402 may select any subset of the miner devices 408 for processing that transaction received at block 104 depending on one or more resource characteristics defined for the system 400. For example, it may be desirable for the resource-based distributed public ledger to be updated quickly and/or maintained with a high processing efficiency, and thus resource information may be identified that indicates that associated miner device includes an age that is less than a predetermined age, that its associated miner device includes a processing efficiency that is greater than a minimum processing efficiency, that indicates that its associated miner device is associated with an average time taken to mine a block for the distributed public ledger (e.g., a blockchain) that is less than a predetermined time, and that indicates that its associated miner device includes meta-details of applications running on that mining device and their impact on latency related to mining blocks for the distributed public ledger (e.g., a blockchain) that is less than a predetermined latency. As such, the subset of the miner devices associated with resource information that satisfies those resource characteristics may be selected by the system provider device(s) 402 at block 106. Similarly, in some embodiments, it may be desirable for the resource-based distribute public ledger to have blocks confirmed as fast as possible, and thus transactions may be provided to the miner devices with the most available resources for processing blocks quickly.

In another example, it may be desirable for the resource-based distributed public ledger to be maintained with low energy costs, and thus resource information may be identified that indicates that its associated miner device includes energy costs associated with operating that mining device that are less than a predetermined energy cost, and resource information that indicates that its associated miner device includes an energy consumption required to mine a block for the distributed public ledger (e.g., a blockchain) that is less than a predetermined energy consumption. As such, the subset of the miner devices associated with resource information that satisfies those resource characteristics may be selected by the system provider device(s) 402 at block 106.

With reference to the decentralized system 500 illustrated in FIGS. 5A and 5B, in an embodiment of block 106 and upon receiving the transaction information for the transaction at block 104, the transaction broadcasting subsystem in the payer device 506 may access the secondary blockchain 512 to identify the respective resource information associated with the identifiers for each of the miner devices 502, and select a subset of the miner devices for processing the transaction based on the identified resource information.

For example, at block 106, the transaction broadcasting subsystem in the payer device 506 may access the secondary blockchain 512 and identify resource information that indicates that its associated miner device includes an amount of available disk space that is greater than a predetermined amount of disk space, resource information that indicates that its associated miner device includes an age that is less than a predetermined age, resource information that indicates that its associated miner device includes a processing efficiency that is greater than a minimum processing efficiency, resource information that indicates that its associated miner device is associated with an average time taken to mine a block for the distributed public ledger (e.g., a blockchain) that is less than a predetermined time, resource information that indicates that its associated miner device includes meta-details of applications running on that mining device and their impact on latency related to mining blocks for the distributed public ledger (e.g., a blockchain) that is less than a predetermined latency, resource information that indicates that its associated miner device includes energy costs associated with operating that mining device that are less than a predetermined energy cost, resource information that indicates that its associated miner device includes an energy consumption required to mine a block for the distributed public ledger (e.g., a blockchain) that is less than a predetermined energy consumption, resource information that indicates that its associated miner device is located at a location that is one of plurality of authorized locations, resource information that indicates that its associated miner device is located in an area with a planned electricity outage, resource information that indicates that its associated miner device was associated with a last known inadvertent shutdown over a predetermined time ago, and/or any resource information that includes any other resource information characteristics that would be apparent to one of skill in the art in possession of the present disclosure.

In other embodiments, the transaction broadcasting subsystem in the payer device 506 may access the secondary blockchain 512 and identify resource information that indicates that its associated miner device is associated with the resource value/score discussed above that may be determined and transmitted by the miner devices 502 as part of the resource information at block 102. In other embodiments, the transaction broadcasting subsystem in the payer device 506 may use the resource information transmitted by any or all of the miner devices 502 to calculate the resource value or resource score based on any of the factors included in the resource information. As such, the transaction broadcasting subsystem in the payer devices of the present disclosure may implement calculations, algorithms, or other resource-information-determining methods for inputting any resource characteristics about a miner device that are included in their associated resource information and outputting a resource value/score that is indicative of the resources available to that miner device.

In response to identifying the resource information at block 106, the transaction broadcasting subsystem in the payer device 506 may select any subset of the miner devices 502 for processing that transaction received at block 104 depending on one or more resource characteristics defined for the system 500. Similarly as discussed above, it may be desirable for the resource-based distribute public ledger to be updated quickly and maintained with a high processing efficiency, and thus resource information may be identified that indicates that associated miner device includes an age that is less than a predetermined age, that its associated miner device includes a processing efficiency that is greater than a minimum processing efficiency, that indicates that its associated miner device is associated with an average time taken to mine a block for the distributed public ledger (e.g., a blockchain) that is less than a predetermined time, and that indicates that its associated miner device includes meta-details of applications running on that mining device and their impact on latency related to mining blocks for the distributed public ledger (e.g., a blockchain) that is less than a predetermined latency. As such, the subset of the miner devices associated with resource information that satisfies those resource characteristics may be selected by the transaction broadcasting subsystem in the payer device at block 106. Similarly, in some embodiments, it may be desirable for the resource-based distribute public ledger to have blocks confirmed as fast as possible, and thus transactions may be provided to the miner devices with the most available resources Also similarly as discussed above, it may be desirable for the resource-based distributed public ledger to be maintained with low energy costs, and thus resource information may be identified that indicates that its associated miner device includes energy costs associated with operating that mining device that are less than a predetermined energy cost, and resource information that indicates that its associated miner device includes an energy consumption required to mine a block for the distributed public ledger (e.g., a blockchain) that is less than a predetermined energy consumption. As such, the subset of the miner devices associated with resource information that satisfies those resource characteristics may be selected by the transaction broadcasting subsystem in the payer device at block 106.

The method 100 then proceeds to block 108 where the at least one system provider device broadcasts the transaction to the subset of computing devices in order to cause a first computing device included in the subset of computing devices to process the transaction at part of a block that is then added to a distributed public ledger. With reference to the partially centralized system 400 illustrated in FIG. 4, in an embodiment of block 108 and upon selecting the subset of the miner devices 408 at block 106, the system provider device(s) 402 may broadcast the transaction received at block 104 through the network 406 to that subset of the miner devices 408. As such, at block 108, the subset of the miner devices 408 that were selected at block 106 will receive the transaction through the network 406. Similarly as discussed above with reference to FIG. 3, upon receiving the transaction, any or all of the subset of miner devices 408 may group that transaction with other transactions (of which those miner devices were selected to receive based on its resource information in substantially the same manner as discussed above) into blocks, and one of those miner devices may process their block in the manner described above such that it is added to the distributed public ledger. In some embodiments (e.g., embodiments in which the resource-based distributed ledger system provides transactions to miner devices 408 that can process those transaction as part of blocks the quickest), a block reward (e.g., a crypto currency allocation made in response to adding the block to a blockchain) may be adjusted (e.g., increased or decreased) depending on how quickly a block was added to the distributed public ledger by that miner device.

With reference to the decentralized system 500 illustrated in FIGS. 5A and 5B, in an embodiment of block 108 and upon selecting the subset of the miner devices 408 at block 106, the transaction broadcasting subsystem in the payer device 506 may broadcast the transaction received at block 104 through the network 504 to that subset of the miner devices 502. As such, at block 108, the subset of the miner devices 502 that were selected at block 106 will receive the transaction through the network 504. Similarly as discussed above with reference to FIG. 3, upon receiving the transaction, any or all of the subset of miner devices 502 may group that transaction with other transactions (of which those miner devices were selected to receive based on its resource information in substantially the same manner as discussed above) into blocks, and one of those miner devices may process their block in the manner described above such that it is added to the distributed public ledger. In some embodiments (e.g., embodiments in which the resource-based distributed ledger system provides transactions to miner devices 502 that can process those transaction as part of blocks the quickest), a block reward (e.g., a crypto currency allocation made in response to adding the block to a blockchain, as discussed above) may be adjusted (e.g., increased or decreased) depending on how quickly a block was added to the distributed public ledger by that miner device.

Thus, systems and methods have been described that provide for the selection of subsets of miner devices that will process a transaction in a block to be added to a distributed public ledger based on the resources available to the miner devices. As such, given any plurality of miner devices that are available to maintain a distributed public ledger such as a crypto currency blockchain, resource information for those miner devices may be utilized to select subsets of those miner devices for processing any number of transactions as part of a block added to that distributed public ledger/crypto currency blockchain. One of skill in the art in possession of the present disclosure will recognize that different subsets of the miner devices may be selected to process different transactions performed via the distributed public ledger/crypto currency blockchain, which allows the distributed public ledger/crypto currency blockchain to be maintain in a desired manner by, for example, processing efficient miner devices, energy cost efficient mining devices, miner devices in particular locations, and/or miner devices including any other resource characteristics that would be apparent to one of skill in the art in possession of the present disclosure.

Figure 6:
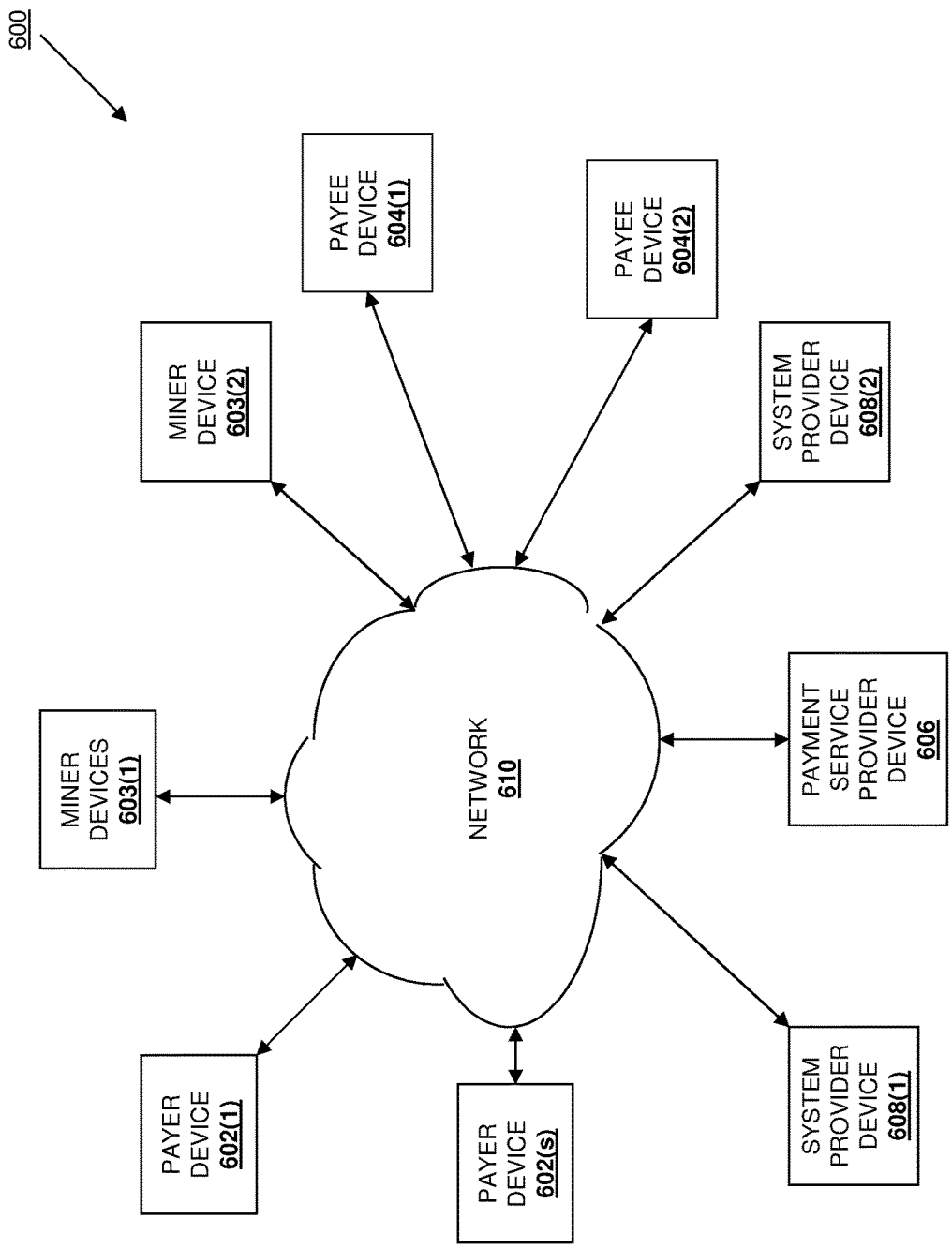
FIG. 6 is a schematic view illustrating an embodiment of a networked system.

Referring now to FIG. 6, an embodiment of a network-based system 600 for implementing one or more processes described herein is illustrated. As shown, network-based system 600 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 6 may be deployed in other ways and that the operations performed and/or the services provided by such servers may be combined or separated for a given implementation and may be performed by a greater number or fewer number of servers. One or more servers may be operated and/or maintained by the same or different entities.

The embodiment of the networked system 600 illustrated in FIG. 6 includes a plurality of payer devices 602 such as the payer devices 602(1), a plurality of miner device 603 such as the miner devices 603(1) and 603(2), a plurality of payee devices 604 such as the payee device 604(1) and 604(2), a payment service provider device 606, and a plurality of system provider devices 608 such as the system provider devices 608(1) and 608(2) in communication over a network 610. Any of the payer devices 602 may be the payer devices 410 and/or 506, discussed above. Any of the miner devices 604 may be the miner devices 408 and/or 502 discussed above. Any of the payee devices 604 may be the payee devices 412 and/or 508 discussed above. The payment service provider device 606 may be the payment service provider devices discussed above and may be operated by a payment service provider such as, for example, PayPal Inc. of San Jose, CA Any of the system provider devices 608 may be the system provider devices discussed above.

The payer devices 602, miner devices 603, payee devices 604, payment service provider device 606, and system provider devices 608 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 600, and/or accessible over the network 610.

The network 610 may be implemented as a single network or a combination of multiple networks. For example, in various embodiments, the network 610 may include the Internet and/or one or more intranets, landline networks, wireless networks, and/or other appropriate types of networks.

The payer device 602 may be implemented using any appropriate combination of hardware and/or software configured for wired and/or wireless communication over network 610. For example, in one embodiment, the payer device 602 may be implemented as a personal computer of a user in communication with the Internet. In other embodiments, the payer device 602 may be a smart phone, personal digital assistant (PDA), laptop computer, and/or other types of computing devices.

The payer device 602 may include one or more browser applications which may be used, for example, to provide a convenient interface to permit the payer to browse information available over the network 610. For example, in one embodiment, the browser application may be implemented as a web browser configured to view information available over the Internet.

The payer device 602 may also include one or more toolbar applications which may be used, for example, to provide user-side processing for performing desired tasks in response to operations selected by the payer. In one embodiment, the toolbar application may display a user interface in connection with the browser application.

The payer device 602 may further include other applications as may be desired in particular embodiments to provide desired features to the payer device 602. In particular, the other applications may include a payment application for payments assisted by a payment service provider through the payment service provider device 606. The other applications may also include security applications for implementing user-side security features, programmatic user applications for interfacing with appropriate application programming interfaces (APIs) over the network 610, or other types of applications. Email and/or text applications may also be included, which allow the payer to send and receive emails and/or text messages through the network 610. The payer device 602 includes one or more user and/or device identifiers which may be implemented, for example, as operating system registry entries, cookies associated with the browser application, identifiers associated with hardware of the payer device 602, or other appropriate identifiers, such as a phone number. In one embodiment, the user identifier may be used by the payment service provider device 606 and/or account provider device 608 to associate the user with a particular account as further described herein.

The payee device 604 may be maintained, for example, by a conventional or on-line merchant, conventional or digital goods seller, individual seller, and/or application developer offering various products and/or services in exchange for payment to be received conventionally or over the network

610. In this regard, the payee device 604 may include a database identifying available products and/or services (e.g., collectively referred to as items) which may be made available for viewing and purchase by the payer.

The payee device 604 also includes a checkout application which may be configured to facilitate the purchase by the payer of items. The checkout application may be configured to accept payment information from the user through the payer device 602, the account provider through the account provider device 608, and/or from the payment service provider through the payment service provider device 606 over the network 610.

Figure 7:
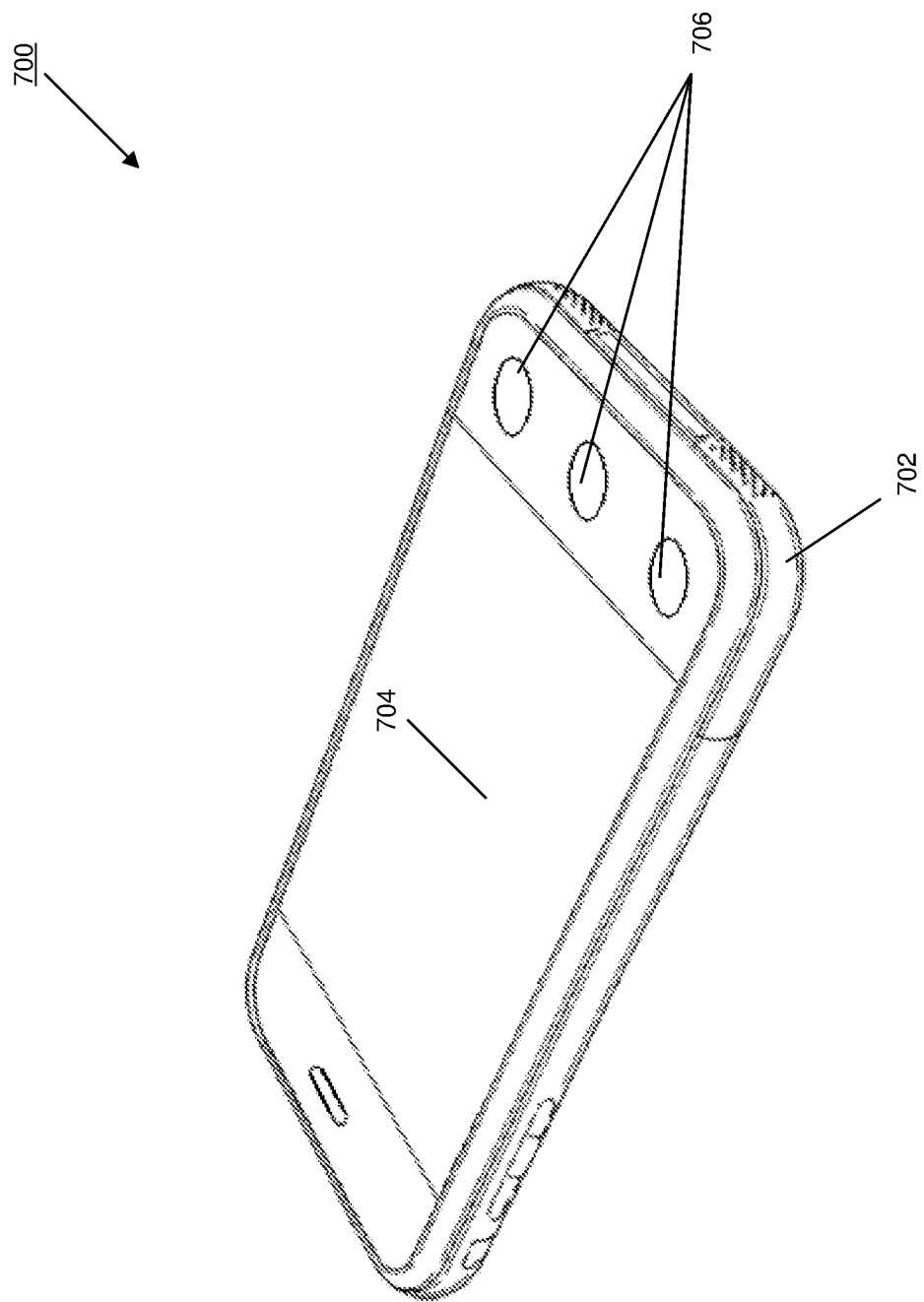
FIG. 7 is a perspective view illustrating an embodiment of a payer/payee/user device.

Referring now to FIG. 7, an embodiment of a payer device 700 is illustrated. The payer device 700 may be the payer devices 410, 506, and/or 602 discussed above. The payer device 700 includes a chassis 702 having a display 704 and an input device including the display 704 and a plurality of input buttons 706. One of skill in the art will recognize that the payer device 700 is a portable or mobile phone including a touch screen input device and a plurality of input buttons that allow the functionality discussed above with reference to the method 100. However, a variety of other portable/mobile payer devices and/or desktop payer devices may be used in the method 100 without departing from the scope of the present disclosure.

Figure 8:
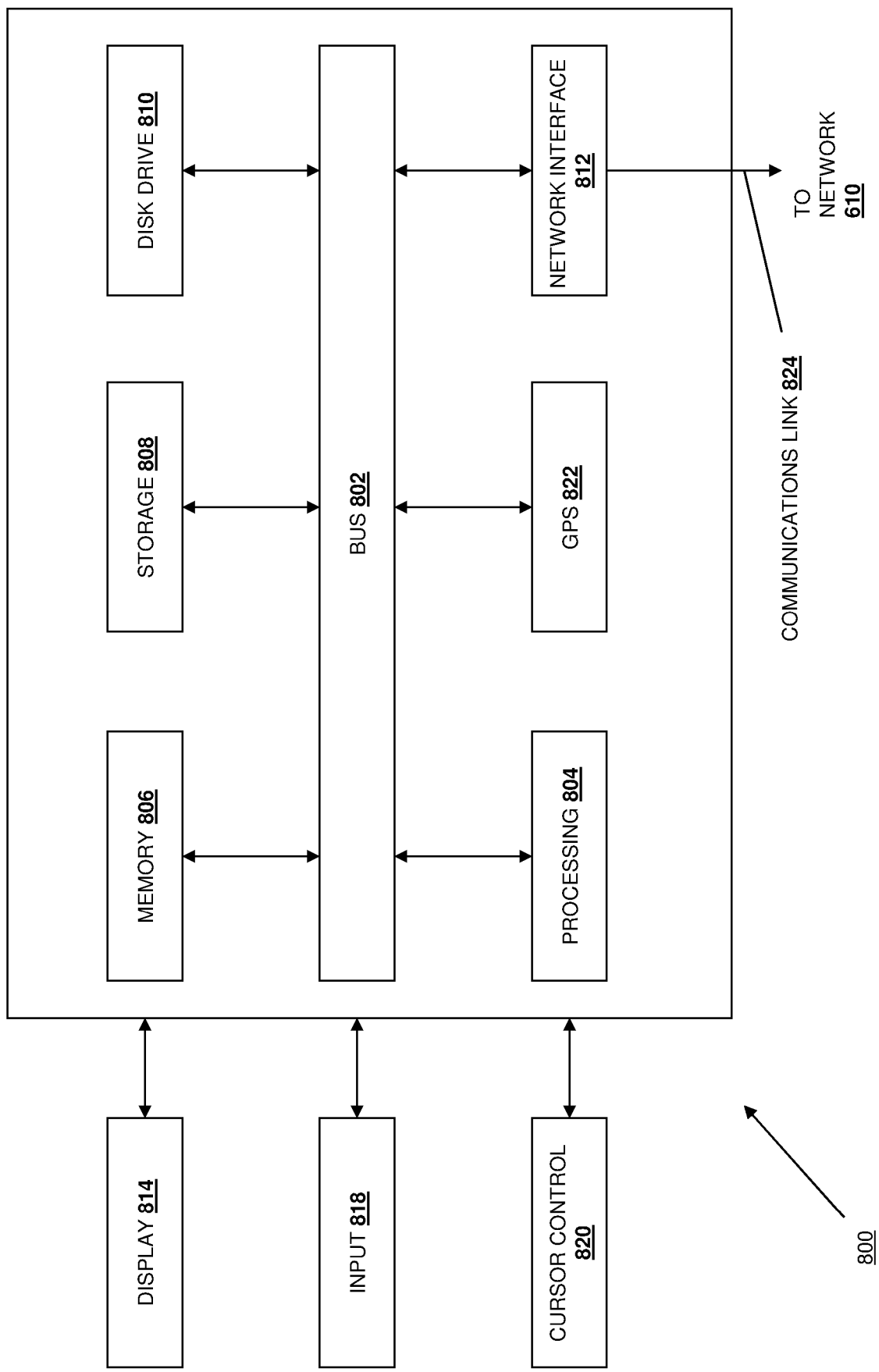
FIG. 8 is a schematic view illustrating an embodiment of a computer system.

Referring now to FIG. 8, an embodiment of a computer system 800 suitable for implementing, for example, the payer devices, the miner devices, the payees device, the payment service provider device, and/or the system provider devices, is illustrated. It should be appreciated that other devices utilized by payer, payees, payment service providers, and system providers in the system discussed above may be implemented as the computer system 800 in a manner as follows.

In accordance with various embodiments of the present disclosure, computer system 800, such as a computer and/or a network server, includes a bus 802 or other communication mechanism for communicating information, which interconnects subsystems and components, such as a processing component 804 (e.g., processor, micro-controller, digital signal processor (DSP), etc.), a system memory component 806 (e.g., RAM), a static storage component 808 (e.g., ROM), a disk drive component 810 (e.g., magnetic or optical), a network interface component 812 (e.g., modem or Ethernet card), a display component 814 (e.g., CRT or LCD), an input component 818 (e.g., keyboard, keypad, or virtual keyboard), a cursor control component 820 (e.g., mouse, pointer, or trackball), and/or a location determination component 822 (e.g., a Global Positioning System (GPS) device as illustrated, a cell tower triangulation device, and/or a variety of other location determination devices known in the art.) In one implementation, the disk drive component 810 may comprise a database having one or more disk drive components.

In accordance with embodiments of the present disclosure, the computer system 800 performs specific operations by the processor 804 executing one or more sequences of instructions contained in the memory component 806, such as described herein with respect to the payer devices, the miner devices, the payee device, the payment service provider device, and/or the system provider devices. Such instructions may be read into the system memory component 806 from another computer readable medium, such as the static storage component 808 or the disk drive component 810. In other embodiments, hard-wired circuitry may be used in place of or in combination with software instructions to implement the present disclosure.

Logic may be encoded in a computer readable medium, which may refer to any medium that participates in providing instructions to the processor 804 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 810, volatile media includes dynamic memory, such as the system memory component 806, and transmission media includes coaxial cables, copper wire, and fiber optics, including wires that comprise the bus 802. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 800. In various other embodiments of the present disclosure, a plurality of the computer systems 800 coupled by a communication link 824 to the network 610 (e.g., such as a LAN, WLAN, PTSN, and/or various other wired or wireless networks, including telecommunications, mobile, and cellular phone networks) may perform instruction sequences to practice the present disclosure in coordination with one another.

The computer system 800 may transmit and receive messages, data, information and instructions, including one or more programs (i.e., application code) through the communication link 824 and the network interface component 812. The network interface component 812 may include an antenna, either separate or integrated, to enable transmission and reception via the communication link 824. Received program code may be executed by processor 804 as received and/or stored in disk drive component 810 or some other non-volatile storage component for execution.

Figure 9:
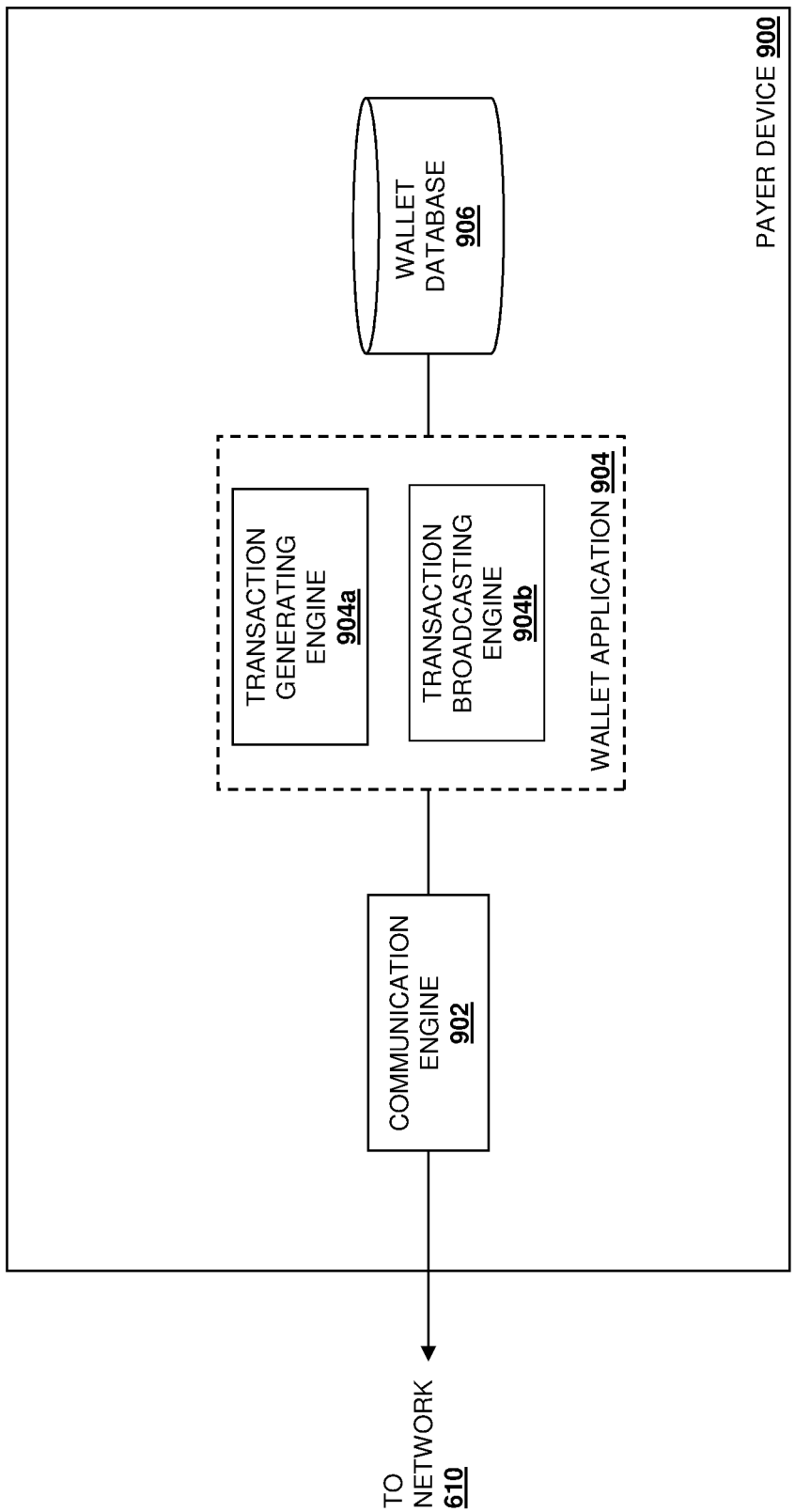
FIG. 9 is a schematic view illustrating an embodiment of a system provider device.

Referring now to FIGS. 9, an embodiment of a payer device 900 is illustrated that may be any of the payer devices 410, 506, 602, and/or 700 discussed above, and may be utilized, for example, in the decentralized system 500 discussed above with reference to FIG. 5. The payer device 900 includes a communication engine 902 that is coupled to the network 610 and to a wallet application 904 that is coupled to a wallet database 906. The communication engine 902 may be software or instructions stored on a computer-readable medium that allows the device 900 to send and receive information over the network 610. The wallet application 904 may be software or instructions stored on a computer-readable medium that, when executed by one or more hardware processors, cause the wallet application 904/payer device 900 to provide a transaction generating engine 904a and a transaction broadcasting engine 904b, discussed above. While the wallet database 906 has been illustrated as located in the payer device 900, one of skill in the art will recognize that it may be connected to the wallet application 904 through the network 610 without departing from the scope of the present disclosure.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on payees and payers; however, a payer or consumer can pay, or otherwise interact with any type of recipient, including charities and individuals. The payment does not have to involve a purchase, but may be a loan, a charitable contribution, a gift, etc. Thus, payee as used herein can also include charities, individuals, and any other entity or person receiving a payment from a payer. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
   a memory configured to store a system provider device; and
   one or more processors coupled to the memory and configured to execute instructions that cause the system provider device to perform operations comprising:
   receiving transaction information for a transaction that is configured to provide for a transfer of a digital asset between a payer device and a payee device via a distributed public ledger;
   accessing resource information of each mining device in a plurality of mining devices, the resource information indicating energy consumption expanded by the each respective mining device for mining a block for the distributed public ledger and energy cost associated with operating the each respective mining device;
   selecting a subset of mining devices from the plurality of mining devices for processing the transaction, each mining device in the subset of mining devices having the resource information indicating the energy consumption that is less than a predetermined energy consumption for mining the block for the distributed public ledger and the energy cost that is less than a predetermined energy cost for operating the each respective mining device in the plurality of mining devices; and
   broadcasting, via a network to the subset of the plurality of mining devices the transaction information for the transaction to cause one of the subset of mining devices to include the transaction in the block on the distributed public ledger.

2. The system of claim 1, wherein the operations further comprise:
   receiving, at the system provider device and over multiple time periods, the resource information from the each mining device in the plurality of mining device; and
   storing the resource information and corresponding identifiers of the each mining device in the plurality of mining devices in a database, wherein the resource information is accessed after the system provider device receives the transaction.

3. The system of claim 1, wherein the resource information indicating the energy consumption expanded by the each mining device in the plurality of mining devices is stored in a secondary distributed ledger, wherein the secondary distributed ledger is a sidechain to the distributed public ledger.

4. The system of claim 1, wherein the operations further comprise:
   transmitting to the subset of mining devices verification information, wherein the verification information verifies the resource information associated with the each mining device in the subset of the plurality of mining devices.

5. The system of claim 1, wherein the operations further comprise:
   receiving the resource information from the each mining device in the plurality of mining devices;
   generating a score for the each mining device in the plurality of mining devices, the score corresponding to the energy consumption and the energy cost indicated in the resource information; and
   storing the scores for the plurality of mining devices in a database.

6. A method, comprising:
   receiving, at a system provider device, transaction information for a transaction that is configured to provide for a transfer of a digital asset between a payer device and a payee device via a distributed public ledger;
   accessing, from the system provider device, resource information of each mining device in the plurality of mining devices, the resource information associated with energy consumption expanded by that mining device for mining a block for the distributed public ledger and energy cost associated with operating that mining device;
   determining, at the system provider device, a score for the each mining device based on the energy consumption and the energy cost associated with the resource information of that mining device;
   selecting, using scores of the plurality of mining devices, a subset of the plurality of mining devices for processing the transaction; and
   broadcasting, via a network to the subset of the plurality of mining devices the transaction information for the transaction to cause one of the subset of the plurality of mining devices to include the transaction in the block on the distributed public ledger.

7. The method of claim 6, further comprising:
receiving, at the system provider device, the resource information from the each mining device in the plurality of mining devices; and
storing the resource information and corresponding identifiers of the each mining device in the plurality of mining devices in a database.

8. The method of claim 6, wherein the resource information indicating the energy consumption and the energy cost expanded by the each mining device in the plurality of mining devices is stored in a secondary distributed ledger, wherein the secondary distributed ledger is a sidechain to the distributed public ledger.

9. The method of claim 6, further comprising:
transmitting, to the subset of the plurality of mining devices, verification information, wherein the verification information verifies the resource information associated with the each mining device in the subset of the plurality of mining devices.

10. The method of claim 6, further comprising:
storing the scores for the plurality of mining devices in a database.

11. The method of claim 6, wherein the system provider device is located on the payee device or the payer device involved in the transaction.

12. The method of claim 6, wherein the system provider device is communicatively coupled over the network to the payer device or the payee device associated with the transaction, and to the plurality of mining devices.

13. A non-transitory machine-readable medium having stored thereon machine-readable instructions executable to cause a machine to perform operations comprising:
receiving, at a system provider device, transaction information for a transaction that is configured to provide for a transfer of a digital asset between a payer device and a payee device via a distributed public ledger;
accessing resource information indicating energy consumption expanded by each mining device of a plurality of mining devices for mining a block on the distributed public ledger and an energy cost of operating the each mining device in the plurality of mining devices, wherein the resource information is accessible prior to the transaction being received at the system provider device;
determining a score using the resource information for the each respective mining device, wherein the score is based on the energy consumption and the energy cost;
selecting, using scores of the plurality of mining devices, a subset of the plurality of mining devices for processing the transaction; and
broadcasting, via a network to the subset of the plurality of mining devices the transaction information for the transaction to cause one of the subset of the plurality of mining devices to include the transaction in the block on the distributed public ledger.

14. The non-transitory machine-readable medium of claim 13, wherein the operations further comprise:
receiving, at the system provider device and prior to the transaction, the resource information from the each mining device in the plurality of mining devices;
storing the resource information and corresponding identifiers of the each mining device in the plurality of mining devices in a database, wherein the resource information of the each mining device is accessed after receiving the transaction;
receiving, at the system provider device, an updated resource information from one mining device in the plurality of mining devices at predefined time periods; and
updating the resource information of the one mining device in the database with the updated resource information.

15. The system of claim 1, wherein the resource information of the each mining device in the plurality of mining devices further indicates a location of the each respective mining device; and
wherein the operations for selecting the subset of the plurality of mining devices further comprise selecting based on the resource information of the each mining device in the plurality of mining devices indicating the location.

16. The system of claim 1, wherein the resource information of the each mining device in the plurality of mining devices further indicates an electrical outage in an area associated with a location of the each respective mining device; and
wherein the operations for selecting the subset of the plurality of mining devices further comprise selecting based on the resource information of the each mining device in the plurality of mining devices indicating the electrical outage in the area associated with the location.

17. The system of claim 1, wherein the resource information of the each mining device in the plurality of mining devices further indicates an average time of the each respective mining device to mine the block for the distributed public ledger; and
wherein the operations for selecting the subset of the plurality of mining devices further comprise selecting based on the resource information of the each mining device in the plurality of mining devices indicating the average time to mine the block being less than a predetermined time.

18. The system of claim 1, wherein the resource information of the each mining device in the plurality of mining devices further indicates a latency of the each respective mining device to mine the block for the distributed public ledger; and
wherein the operations for selecting the subset of the plurality of mining devices further comprise selecting based on the resource information of the each mining device in the plurality of mining devices indicating the latency that is less than a predetermined latency.

19. The system of claim 1, wherein the resource information of the each mining device in the plurality of mining devices further indicates an age of the each respective mining device; and
wherein the operations for selecting the subset of the plurality of mining devices further comprise selecting based on the resource information of the each mining device in the plurality of mining devices indicating the age being less than a predetermined age.

20. The method of claim 6, wherein the resource information of the each mining device in the plurality of mining devices indicates an electrical outage in an area associated with a location the each respective mining device; and wherein the determining the score for the each mining device in the plurality of mining devices is further based on the resource information of the each mining device indicating the electrical outage in the area associated with the location.

\* \* \* \* \*

UNITED STATES PATENT AND TRADEMARK OFFICE
CERTIFICATE OF CORRECTION

PATENT NO. : 11,961,070 B2  
APPLICATION NO. : 17/977225  
DATED : April 16, 2024  
INVENTOR(S) : Pankaj Sarin Page 1 of 1

It is certified that error appears in the above-identified patent and that said Letters Patent is hereby corrected as shown below:

In the Claims

In Claim 1, Column 18, Line 5, change "mining devices the transaction" to --mining devices, the transaction--

In Claim 2, Column 18, Line 13, change "the plurality of mining device;" to --the plurality of mining devices;--

Signed and Sealed this  
Twenty-fourth Day of September, 2024

Katherine Kelly Vidal  
*Director of the United States Patent and Trademark Office*